United States Patent [19]
Anderson et al.

[11] Patent Number: 5,710,769
[45] Date of Patent: Jan. 20, 1998

[54] MERGING THE FUNCTIONS OF SWITCHING AND CROSS CONNECT IN TELECOMMUNICATIONS NETWORKS

[75] Inventors: Thomas Wayne Anderson, Naperville; Lih-Fen Leu Wu, Lisle, both of Ill.

[73] Assignee: Lucent Technologies Inc., Murray Hill, N.J.

[21] Appl. No.: 609,162

[22] Filed: Feb. 29, 1996

[51] Int. Cl.⁶ .................................................. H04L 12/56
[52] U.S. Cl. .................................... 370/355; 370/395
[58] Field of Search ................................ 370/307, 355, 370/360, 395, 396, 905

[56] References Cited

U.S. PATENT DOCUMENTS

| | | | |
|---|---|---|---|
| 4,922,483 | 5/1990 | Kobayashi | 370/307 |
| 5,042,062 | 8/1991 | Lee et al. | 379/54 |
| 5,138,657 | 8/1992 | Colton et al. | 379/220 |
| 5,343,462 | 8/1994 | Sekihata et al. | 370/355 |
| 5,383,183 | 1/1995 | Yoshida | 370/355 |
| 5,420,858 | 5/1995 | Marshall et al. | 370/395 |
| 5,434,854 | 7/1995 | Focarile et al. | 370/395 |

*Primary Examiner*—Benedict V. Safourek
*Attorney, Agent, or Firm*—Werner Ulrich

[57] ABSTRACT

Apparatus and a method for establishing voice band telecommunications connections using a cross connect/switching system (CCSS) for establishing all or part of the connection setments required for individual calls. The CCSS contains bundles of provisioned paths and also has facilities for establishing individual per call paths which do not use these bundles. When a call is received, the CCSS switches the call through a combination of provisioned and unprovisioned paths. In the preferred embodiment, the CCSS is an asynchronous transfer mode (ATM) switch enhanced with converters to communicate with pulse code modulation (PCM) facilities for communicating with other switches and with associated PCM switches. Terminal adapters are provided in either the CCSS or the associated switches or both for processing voice signals to perform functions such as echo cancellation or speech quality enhancement. Advantageously, such a switch can support a very large node that carries extensive wideband and broadband signal traffic as well as the voice band traffic.

18 Claims, 10 Drawing Sheets

MERGING THE FUNCTIONS OF SWITCHING AND CROSS CONNECT IN TELECOMMUNICATIONS NETWORKS

RELATED APPLICATION

This invention is related to T. W. Anderson et al.: "Control of Telecommunications Networks" Ser. No. 08/609,161 filed Feb. 29, 1996 being filed concurrently and assigned to the assignee of this application.

TECHNICAL FIELD

This invention relates to the integration of switching and cross connect functions in large telecommunications networks.

PROBLEM

In large modern telecommunications networks, two types of elements are used to provide for switchable interconnections among channels of the transmission facilities interconnecting nodes of the network. The first type of element is a telecommunications switch, which is used for establishing individual call connections between individual lines or individual trunks of the facilities terminating on the switch. The second is a cross connect system, such as AT&T's digital access and cross connect system (DACS), which is used for establishing provisioned connections among such facilities; such provisioned connections remain for much longer periods of time.

A transmission facility carries communication channels or circuits for a plurality of trunks or for a plurality of lines. The cross connect systems are used for establishing long term private inter-facilities connection as well as inter-facilities connections required for offering public switched telephone service. The cross connect systems extract subgroups from facilities carrying a large group of circuits, and switch these subgroups to other groups flexibly so that, effectively, any incoming subgroup of any group can be connected to any outgoing subgroup of any other group. Modern cross connect systems, especially those which switch asynchronous transfer mode (ATM) signals can be very large and can serve several large switching systems.

While some arrangements have been described wherein a subgroup, such as a T1 carrier subgroup capable of carrying 24 speech channels, can be switched in a cross connect system for a specific call under the control of an associated switch, (see U.S. Pat. No. 5,042,062), there has never been an attempt to fully integrate the operations of cross connect systems with those of switching systems for establishing individual voice band (base band) calls. The advantage of such integration is that the large capacity of the cross connect system can be utilized for establishing connections which would otherwise traverse one or two of the connected switches; this reduces plant costs for switching and operation costs for network maintenance and administration. A problem of the prior art is the inability to fully integrate the operations of cross connect systems, having the ability to switch provisioned wideband or broadband signals, with switching systems, which switch base band signals on a per call basis.

SOLUTION

The above problem is solved and an advance is made over the prior art, in accordance with the principles of applicants' invention, wherein a large ATM (asynchronous transfer mode) switch is used as the core of a cross connect/ switching system (CCSS). Signals on facilities connected to the cross connect system, if they are not in the ATM mode, are first converted into the ATM mode so that the high capacity of the ATM cross connect system can be utilized. A single control of path selection is used to select paths for individual calls on a combined basis in the ATM CCSS and the time division network of a conventional switch (such as AT&T's 4ESS™ switch). Advantageously, the ATM CCSS can be used for switching multichannel signals as easily as single channel signals.

In accordance with one preferred embodiment of applicant's invention, the switch is used initially to provide terminal adapter functions for at least some calls. These functions include echo cancellation, voice enhancements (such as True Voice℠), in line announcements, in line monitoring capabilities for customer-dialed dual tone multi-frequency (DTMF) digits, and inband supervisory signaling. Advantageously, these arrangements allow for a transition between an arrangement in which most of the switching is performed in the present switching system to an arrangement in which much or all of the switching is performed in the CCSS, and allows for a reuse of equipment from the present switching systems prior to an ultimate solution, wherein essentially all of the switching is performed in the CCSS. In the latter case, terminal adapters are connected to the CCSS for most or all calls.

The ATM CCSS also performs the conventional cross connect function. Control for establishing cross connect connections can come directly from an operations support system 15 (FIG. 1) or can come from a switch that has received a request from such a support system. In the latter case, control of connections in the ATM CCSS is basically the same as the control of connection for individual calls.

DETAILED DESCRIPTION

Figure 1:
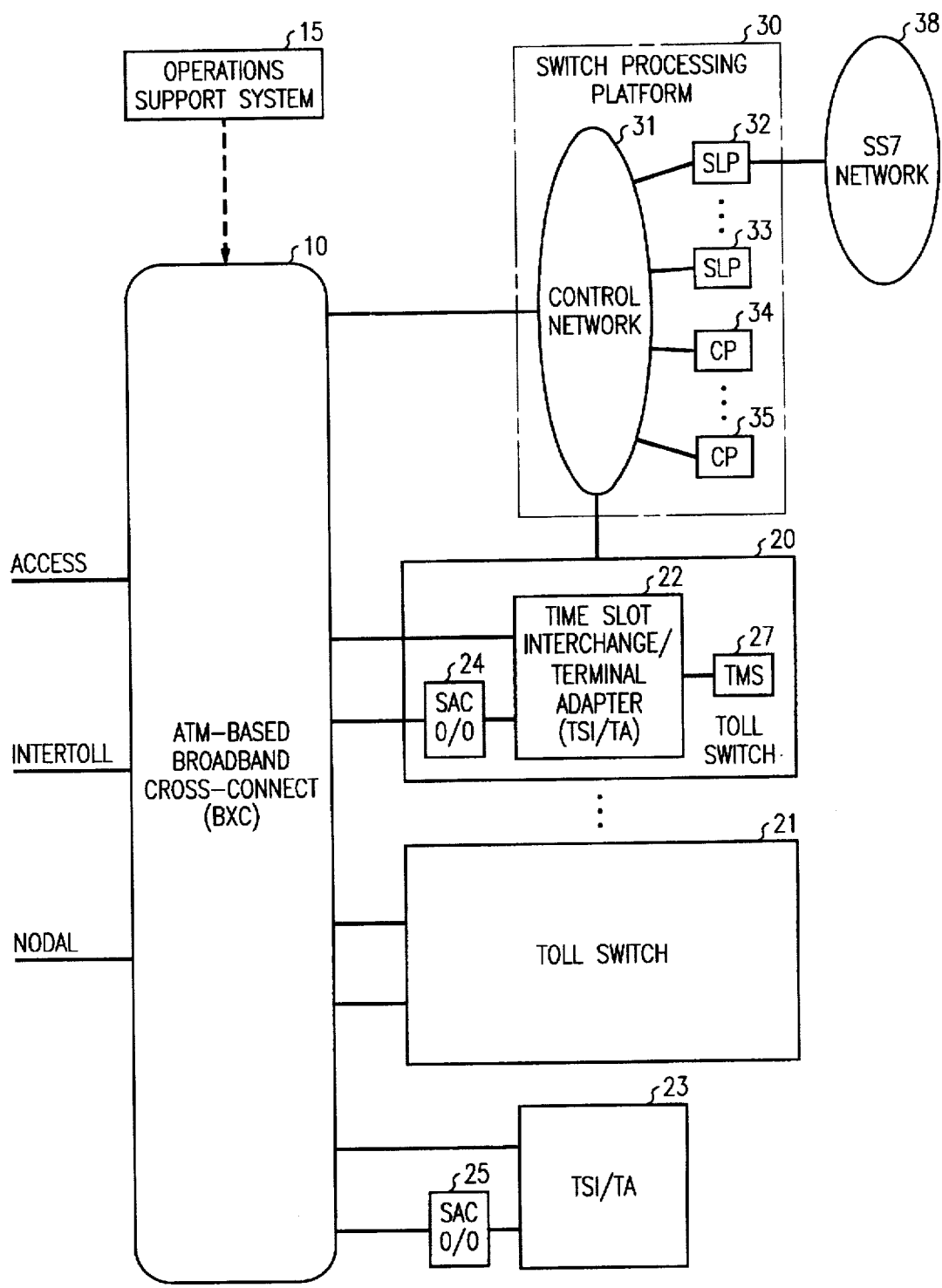
FIG. 1 is an overall block diagram illustrating the connection among major units used in implementing applicants' invention.

FIG. 1 is a basic block diagram illustrating the principles of the invention. Applicant's specific exemplary embodiment is a large telecommunications network such as AT&T's toll network. A key element is a broad band cross connect/ switching system (CCSS) (BXC) system 10 which is based on switching ATM signals. Such an ATM CCSS can be made quite large and therefore can serve a very large amount of multi-rate traffic. In this exemplary embodiment, each DS0 cell switched by the ATM CCSS contains data for only one call. If the call is a voice call, and the data is PCM data, the normally undesirable six millisecond delay caused by accumulating the forty-eight samples necessary to fill one ATM cell is not a problem because each call, in accordance with applicants' preferred embodiment, uses a terminal adapter with a built-in echo canceler for eliminating the undesirable effects of even a small delay. The CCSS is connected to access facilities from local switches, to inter-toll facilities, and to nodal facilities for accessing private circuits such as those from a Private Branch Exchange (PBX). BXC 10 is also connected to one or more toll switches, 20, . . . , 21. Output signals from BXC are terminated in the toll switch on a unit referred to as a time slot interchange/terminal adaptor (TSI/TA) unit 22, described further hereinafter. TSI/TA unit 22 performs the function of a time slot interchange and is connected at the input side to the BXC and at the output side to both a time multiplex switch of the toll switch 20 and to the BXC through a pulse code modulation (PCM)/ATM converter, SAC 0/0 24 (described hereinafter). Additionally the TSI/TA performs a number of terminal adapter functions: it provides echo cancellation for any channel selectively; it provides voice enhancements such as AT&T's True Voice$^{SM}$; it provides in-line announcements (branding) as well as channel monitoring capabilities; it converts inband supervisory signals and switch generated inband digit signals into signaling messages; it performs signaling; and it provides or accepts data for performing the required operations, administration, maintenance, and provisioning functions required to monitor each DS1 facility.

The term SAC stands for synchronous to asynchronous converter which acts as a DS (a PCM signal) to ATM converter, with the first number referring to the level of DS signals at one side of the conversion and the second number referring to the level of DS signals carried in ATM cells. Thus, SAC 3/1 signifies a converter between DS3 signals and ATM cells carrying a DS1 signal, and SAC 0/0 signifies a converter between DS0 signals (8000 PCM samples per second) and ATM cells carrying DS0 signals (i.e., 47 PCM samples of one call). SAC units are well known in the prior art.

The TSI/TA unit 22 on the toll switch has an output to the BXC so that the BXC can use the capabilities of the TA for it's own internal functions. In addition, the BXC is connected to TSI/TA unit 23 for performing terminal adapter functions required within the BXC.

Figure 2:
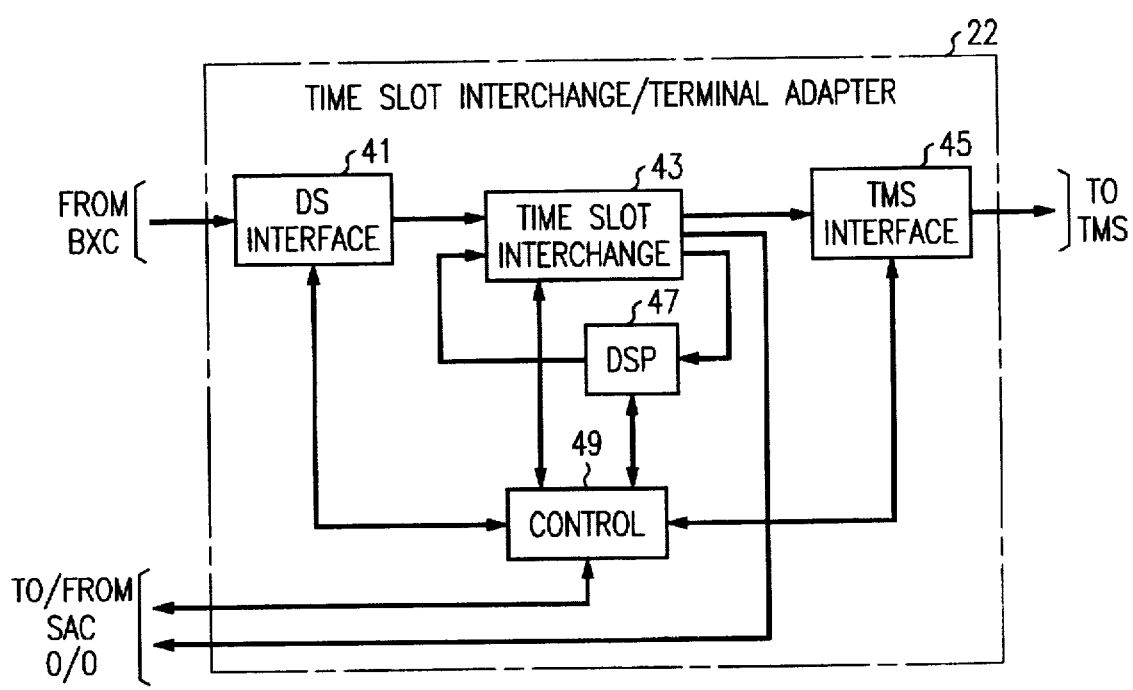
FIG. 2 is a detailed block diagram of a time slot interchange/terminal adapter unit.

TSI/TA unit 22 is shown in detail in FIG. 2 includes an interface 41 to a DS signal for converting the DS format generated by an SAC of the BXC into a format that can be used by a TSI unit. The output of this interface is used as an input to a TSI unit 43 whose output is connected to a time multiplex switch (TMS) Interface 45 for use as an input by a TMS 27 of toll switch 20, and is also connected to a separate SAC 0/0 unit 24 for sending output signals to an ATM switch. The output of the TSI unit 43 is also used as an input to a digital signal processor (DSP) 47 for providing echo cancellation and other signal processing features required to carry out terminal adapter functions. The output of the DSP 49 is reconnected to the input of TSI unit 43 to provide switched access to the DSP functions. (A signal which requires processing by the DSP therefore occupies two time slots in the TSI unit). A control unit 49 controls the actions performed by each of the other units of the TSI/TA, and also controls the SAC 0/0 24 associated with the TSI/TA unit 22. Aspects of the TSI/TA arrangement have been described in patent application Ser. No. 08/334,308, recently allowed.

TSI/TA unit 23 and associated SAC 0/0 25 are connected to BXC 10. TSI/TA unit 23 does not require a TMS interface such as unit 45 found in TSI/TA unit 22, but is otherwise the same as that unit.

In this preferred embodiment call control is supplied by a switch processing platform 30 shown in FIG. 1. The switch processing platform (SPP) is described more fully in the related application being filed concurrently herewith. A plurality of SPPs are interconnected by a control network 31 for communicating among the processors of the SPPs and communicating with switch 20 and BXC 10 as well as other switches and BXCs of the network of which BXC 10 and switch 20 are parts. The control network 31 in the preferred embodiment is an ATM network which allows a high volume of message traffic to be transmitted rapidly. Interconnected by the control network 31 are signaling link processors (SLPs) 32, ..., 33. These SLPs receive messages, for example, from a Signaling System 7 (SS7) network 38 which may be connected to other communication networks (not shown). The SLPs forward messages to selected call processors 34, ..., 35 which actually perform call processing for the calls in the telecommunications network. Call processors communicate with BXC 10 and switch 20 to request the establishment or disconnection of connections in these switches and CCSS systems. Advantageously, as discussed in the related application, any call processor can process a call involving any plurality of switches and, as described herein, CCSSs in the telecommunications network. This improves the reliability of the call processing system and simplifies the control of calls involving more than one switch and/or CCSS.

This arrangement has a number of advantages. Though the toll switches are primarily used during a transitionary period, eventually, many, if not most calls, can be switched directly within the BXC. This has the advantage of not only eliminating an extra switch, but can take full advantage of the large capacity presently existing and expected to exist in the future in an ATM based CCSS such as the BXC. During the transition, the terminal adapters and time slot interchanges of the toll switches can be used by the BXC to avoid the cost of additional units. With a large ATM CCSS, many switches can be effectively consolidated onto one.

The signaling network 38 directs an incoming address message (IAM), the initial message announcing a call, to an appropriate signalling link processor (SLP) (32, ..., 33) for transmission to a call processor (CP) (34, ..., 35). The CP then signals to the toll switch 20 and BXC 10 to establish the appropriate connection. Broad band connections can be advantageously set up within the BXC without having to traverse the toll switch. In a toll network, a plurality of switching processing platforms (SPPs) 30 will be found and the SLP and CP need not be in the same SPP.

The various path arrangements shown in FIGS. 3–10 are for different assumptions as to the type of outgoing trunk (circuit or ATM), as to whether the incoming and outgoing trunks are terminated on the BXC or on the toll switch, and whether the toll switch is equipped with terminal adapters. A trunk is considered to be terminated on the toll switch if it is connected to the toll switch through a provisioned or wired connection; it is considered to be terminated on the BXC if it is connected through a provisioned and/or wired connection to a terminal adapter 23 associated with the BXC and not further provisioned or wired to the toll switch. Effectively a trunk is terminated on the switch or BXC where the provisioned or wired path stops. In all of the examples of FIGS. 3–10, a non-blocking path can be established between the incoming and outgoing trunk in accordance with applicants' preferred embodiment.

FIGS. 3–10 show the connection configuration for a number of different types of toll connections. In all the examples, a connection is being established between a channel on a DS3 access facility and a channel on a DS3 or ATM intertoll facility. In this preferred exemplary embodiment, BXC 10 switches composite DS1 cells and single channel DS0 cells. In the U.S. standard, 24 DS0 channels make up one DS1 signal; an ATM DS1 cell contains two PCM (pulse code modulation) samples from each of the twenty four channels of a DS1 group. BXC 10 also handles DS0 cells, each of which contains 48 samples of one channel. A DS3 PCM input stream is converted into a stream of DS1 cells at the SAC 3/1 units connected to transmission facilities. Such DS1 cells are switched in the BXC 10 to other SAC 3/1 units which reconvert these DS1 cells into DS3 PCM signals. Such DS3 PCM signals are received in a TSI/TA unit 22 or 23 where all the TA functions are performed to generate PCM samples which are converted into DS0 cells by the SAC 0/0 24 or 25. It is assumed in this embodiment that the facilities connected to the toll network are DS3 facilities which in blocks 11 are converted into DS1 ATM cells.

Individual segments of a path are labeled A, B, C, . . . , and indicated on the diagram with a circle around an upper case letter. The segments are labeled consecutively.

In the arrangements shown in FIGS. 3-10, which relate to base band calls, ATM DS1 call paths in BXC 10, i.e., paths between two SAC 3/1 blocks 11, are provisioned. Provisioned paths remain established much longer than single call paths and are under the direct or indirect control of an operation support system 15. All DS0 cell paths in BXC 10, shown as paths connecting two points on the edge of the BXC, are switched for individual calls, and are therefore not provisioned. In this preferred embodiment, voice band DS0 paths are switched and all voice band DS1 paths are provisioned. Wideband (e.g. rate DS1) or broadband (e.g., DS3 or any ATM rate) connections in BXC 10 may use non-provisioned paths.

Figure 3:
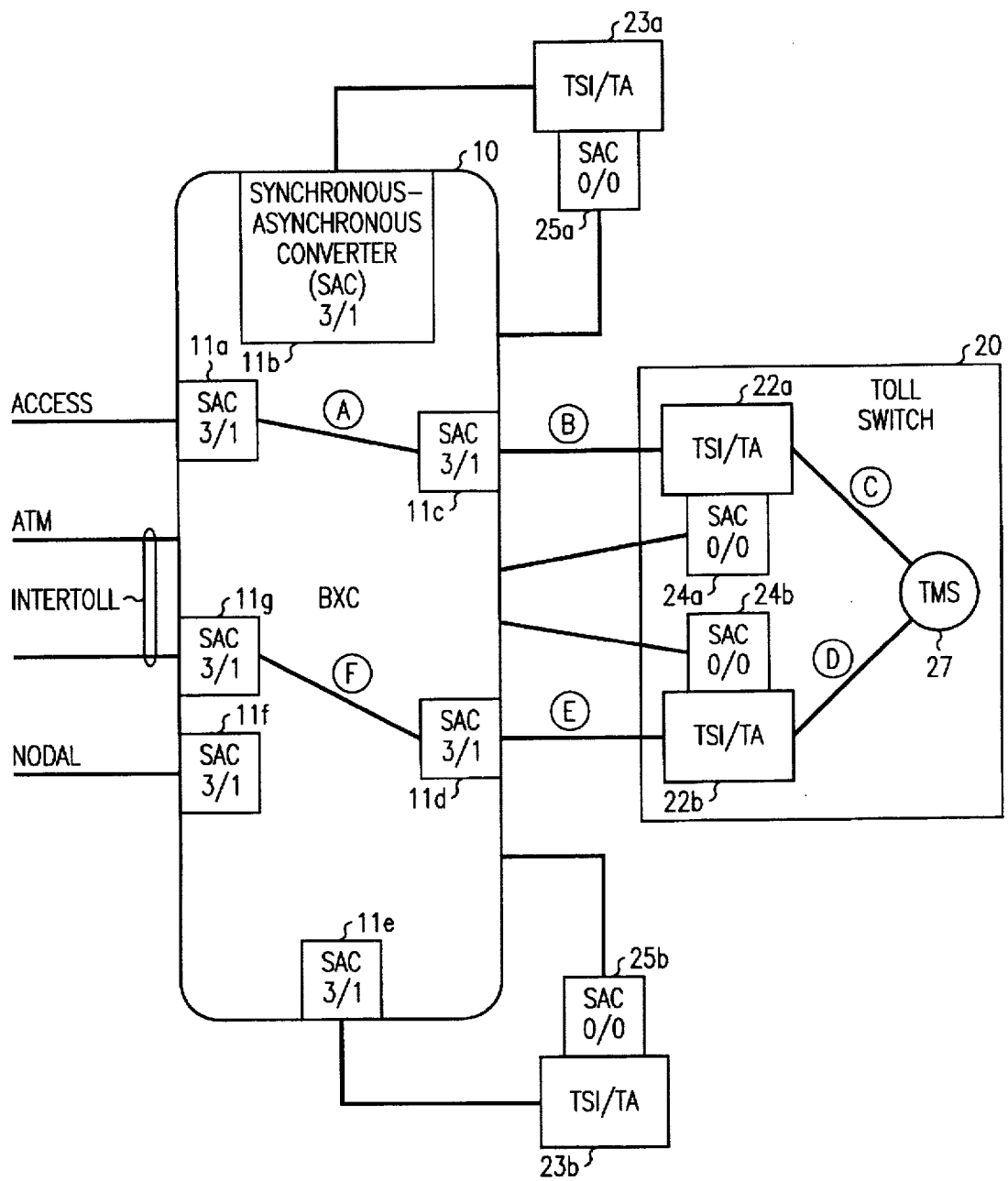
FIGS. 3–10 are path configurations of calls established in accordance with applicants' invention.

FIG. 3 illustrates a connection, between a toll access facility and an intertoll facility for a call which originates on the toll access facility and terminates on a facility accessible only via the inter-toll facility, in general accordance with the teachings of the prior art. The first leg A of this connection is between the toll access facility and the output of the BXC connected to toll switch 20. In order to have the DS0 channel of the particular call switched by the ATM switch facilities of BXC 10, the call passes through two blocks 11 (SAC 3/1 units), once for conversion to ATM cells and once for conversion from ATM cells. Leg B is then a DS3 facility connecting BXC 10 and toll switch 20. The facility terminates on TSI/TA 22a and is switched therein (Leg C) and via time multiplex switch (TMS) 27 to (Leg D) another TSI/TA whence the call is carried over another DS3 PCM facility (Leg E) to the BXC and switched in the BXC (Leg F) as an ATM signal to the appropriate inter-toll trunk. In FIG. 3, legs A and F are provisioned, C and D are switched, B and E are wired.

Figure 4:
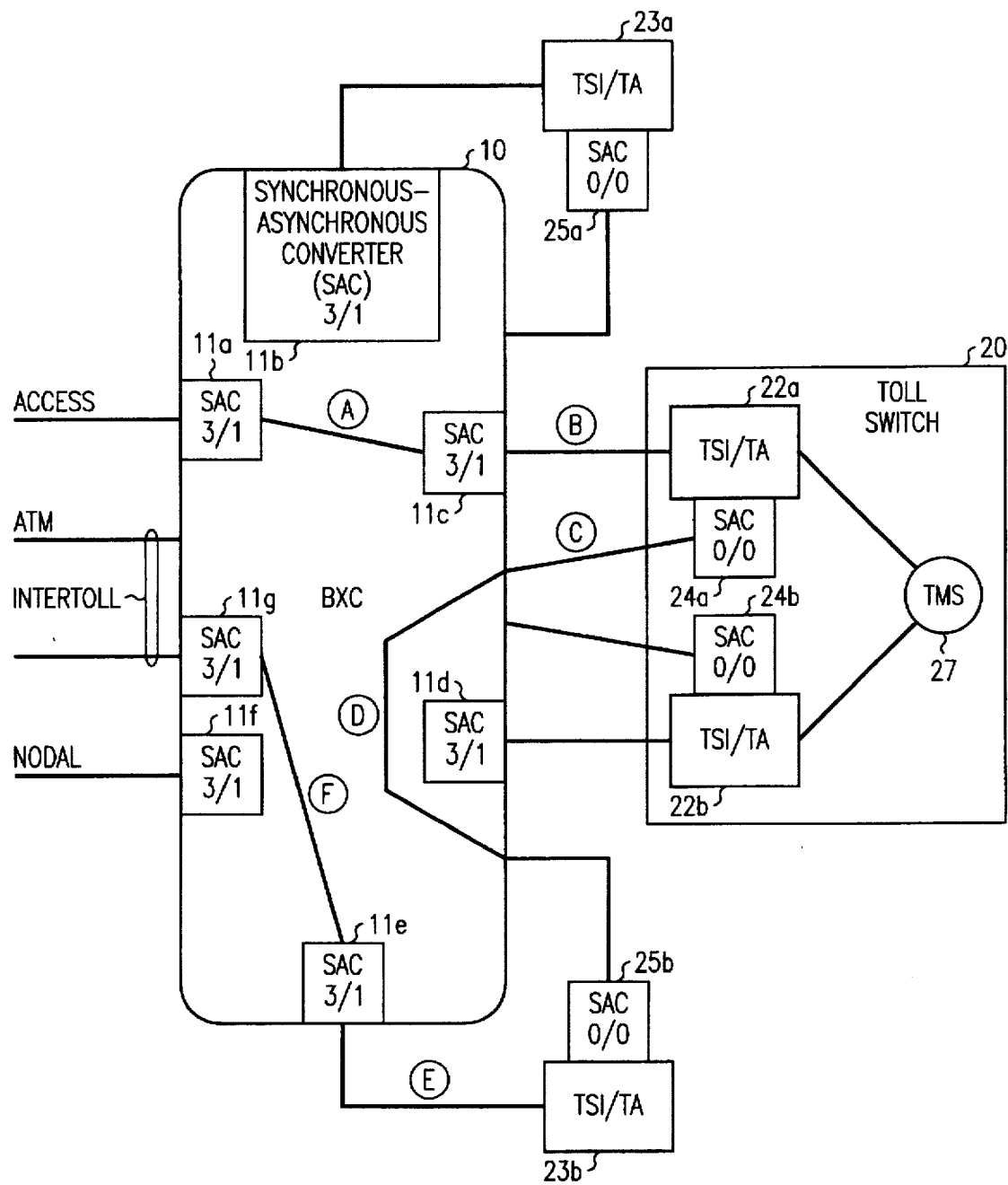

FIG. 4 illustrates a connection wherein one of the paths between the BXC 10 and toll switch 20 is an ATM path. The connection of FIG. 4 utilizes TSI/TA and SAC 0/0 blocks connected to BXC 10. Because the path from SAC 3/1 11a to SAC 3/1 11c (Leg A) is provisioned, the channel from the access facility is treated essentially as if the trunk of that channel terminated (Leg B) on switch 20; however, the intertoll trunk is treated as if it were terminated on BXC 10, because the switching through TSI/TA 23b, connected to BXC 10, is performed for that call. The first two legs of the path are the same, but now the output of TSI/TA 22 is sent to SAC 0/0 24a from which it goes back to BXC 10 over an ATM facility (Leg C); within the ATM facility, the call is switched (Leg D) to the block 25b and its associated TSI/TA block 23b from which it reenters the BXC via a DS3 facility (Leg E). The DS3 signal is then convened back to a DS1 ATM signal which is switched in BXC 10 (Leg F) back to block 11g connected to the inter-toll trunk. In FIG. 4, legs A and F are provisioned, D is switched, and B, C, and E are wired.

Figure 5:
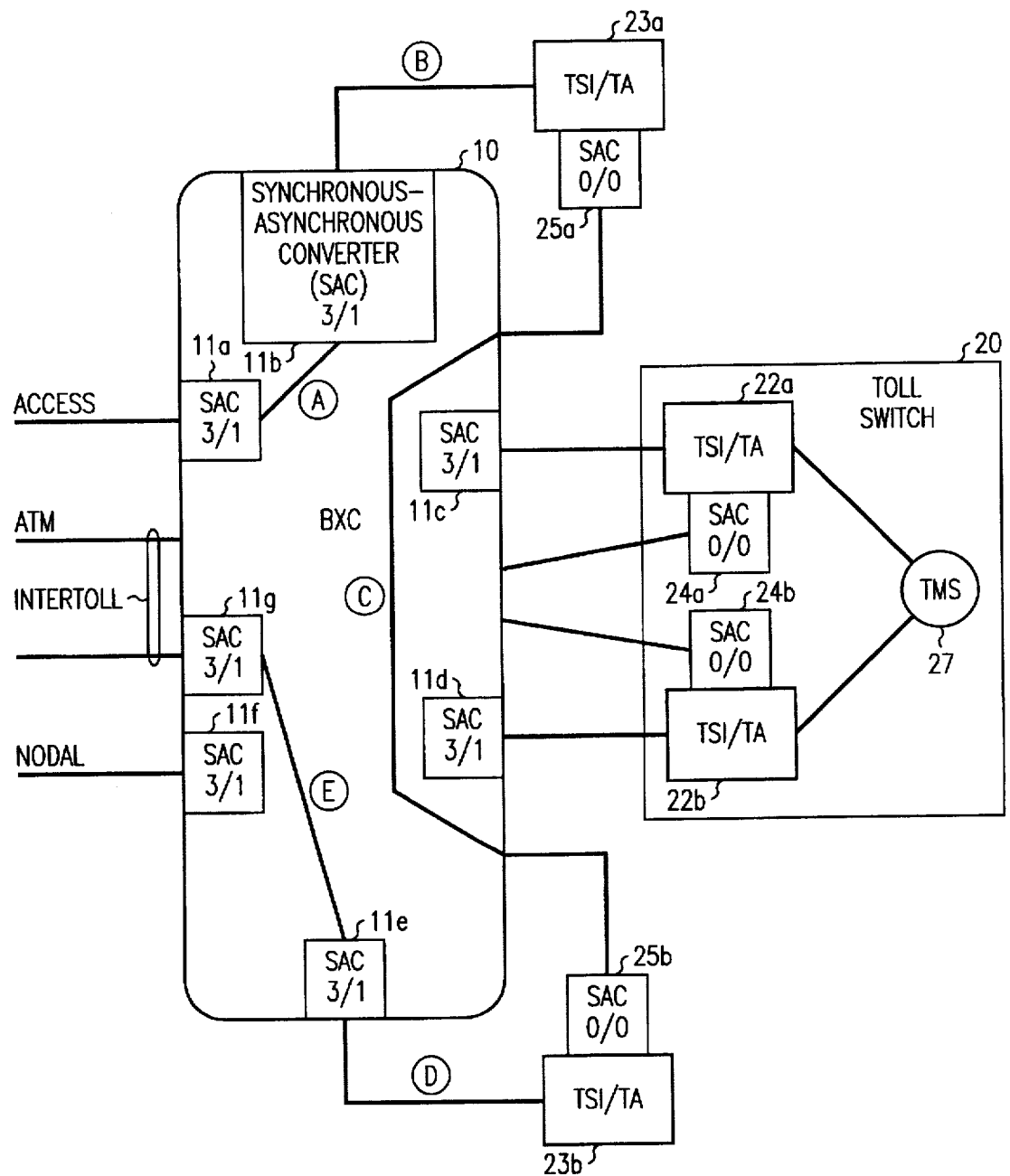

FIG. 5 illustrates the same connection made without the use of the toll switch. Therefore, both the incoming and outgoing trunk are treated as if they were terminated on BXC 10. The incoming signal from the access facility is converted by SAC 3/1 block 11a to a stream of DS1 cells and this stream is switched over Leg A in the BXC to SAC 3/1 block 11b. The output of that block is a DS3 PCM stream which is sent over Leg B to the TSI/TA 23a to generate in block 25a a group of DS0 ATM cells. The DS0 cells are switched in BXC 10 (leg C) to another SAC 0/0 converter connected to another TSI/TA (block 23b) which generates a DS3 PCM signal which is then transmitted over leg D to another SAC 3/1 (block 11e). Block 11e then generates a stream DS1 ATM cells the appropriate ones of which are switched by BXC 10 over leg E to the SAC 3/1 (block 11g) connected to the inter-toll facility. In FIG. 5, legs A and E are provisioned, C is switched, and B and D are wired.

Figure 6:
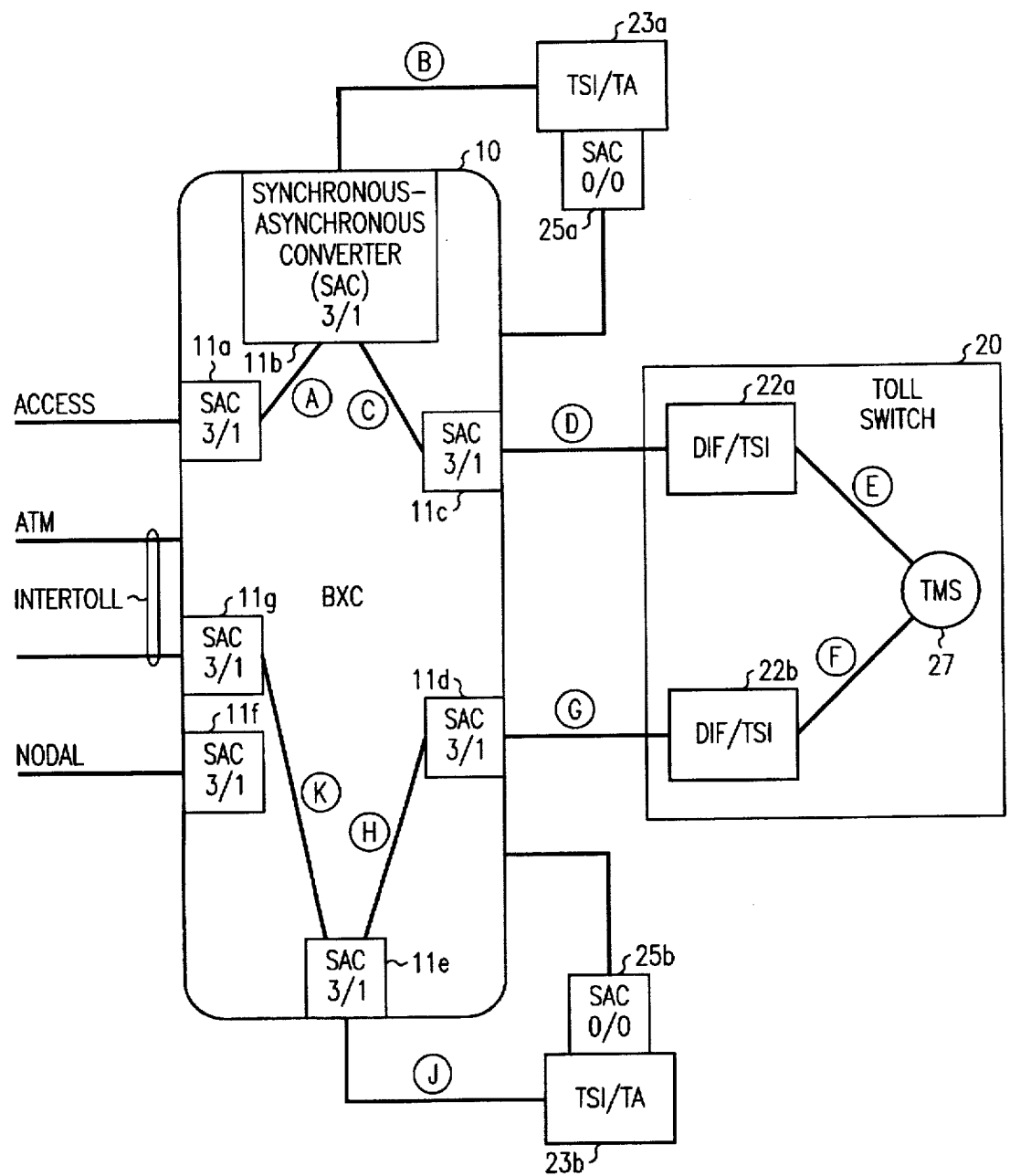

FIG. 6 illustrates the same path established using a toll switch. Both incoming and outgoing trunks are treated as if they were terminated on switch 20. This particular toll switch, however, only has a digital interface frame TSI (DIF/TSI) and is not equipped with TAs. The TA functions must be supplied by the TAs attached to BXC 10. In this case, the TSI/TA is accessed as described with respect to FIG. 5 (legs A and B) but instead of using SAC 0/0 output, the TSI/TA returns a processed DS3 signal to the SAC 3/1 (leg B) whose output DS1 ATM cells are switched in BXC 10 to SAC 3/1 11c (leg C) connected to the toll switch over leg D. The toll switch switches the appropriate channel of the connection back to the BXC (legs E, F and G) which then completes the connection to the inter-toll facility picking up the services of the TSI/TA on the way (legs H, J and K). In FIG. 6, legs A, C, H and K are provisioned, E and F are switched, and B, D, G and J are wired.

Figure 7:
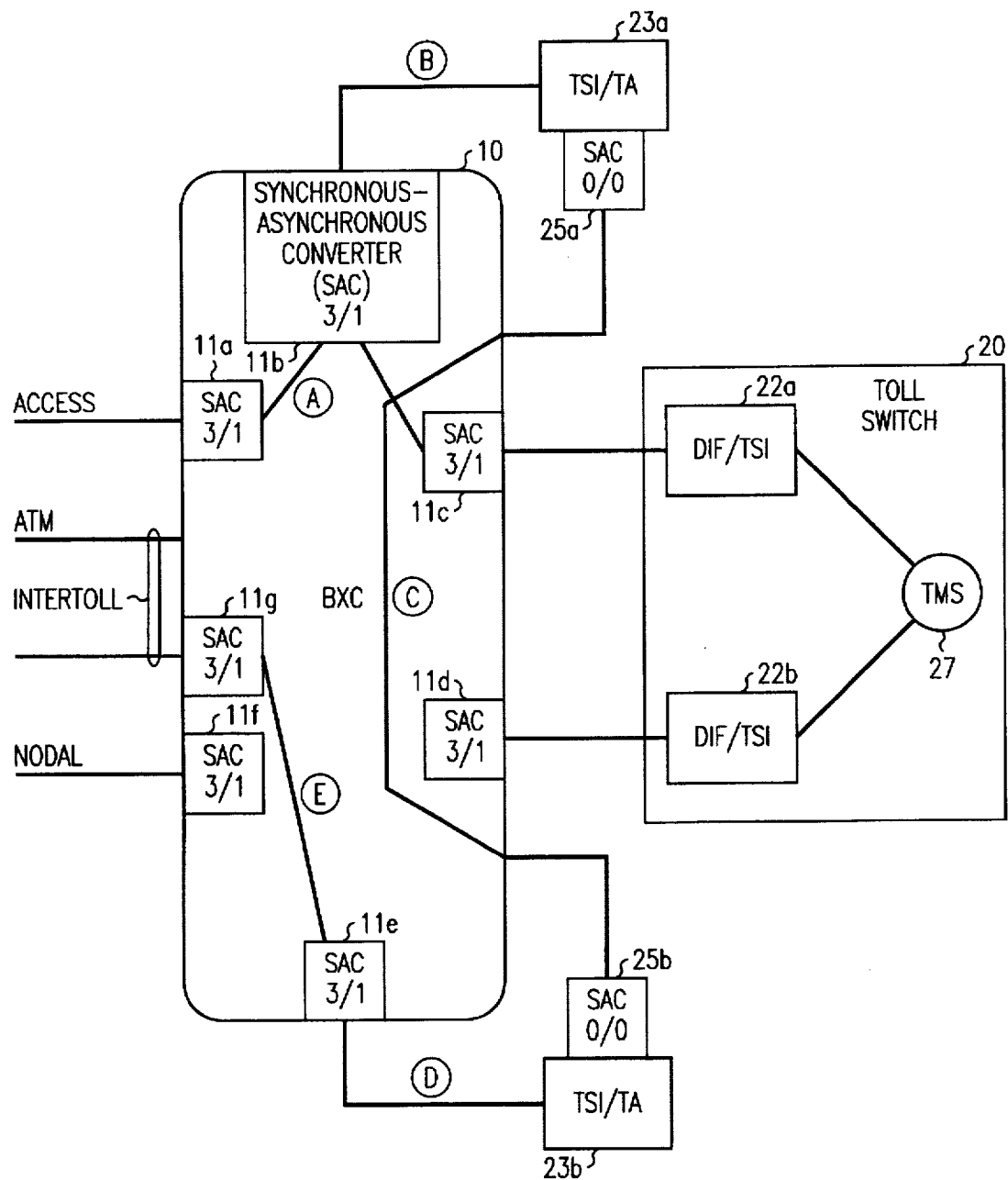

The configuration of FIG. 7 is similar to that of FIG. 6 except that even though the incoming trunk is terminated on the toll switch, the connection path must be intercepted because the toll switch does not have a terminal adapter capability. Consequently, leg A is used to connect the incoming signal to terminal adapter 23a over leg B. At this point, the path is intercepted and, instead of being routed back through leg B to the toll switch, the path is forwarded to SAC 0/0 25a. The output of SAC 0/0 25a is connected through leg C to SAC 0/0 25b, thence to TSI/TA 23b. The output of TSI/TA 23b is then connected over leg D to SAC 3/1 11e, and therefrom to SAC 3/1 11g over leg E. SAC 3/1 11g is connected to the outgoing intertoll trunk. In FIG. 7, legs A and E are provisioned, C is switched, and B and D are wired.

Figure 8:
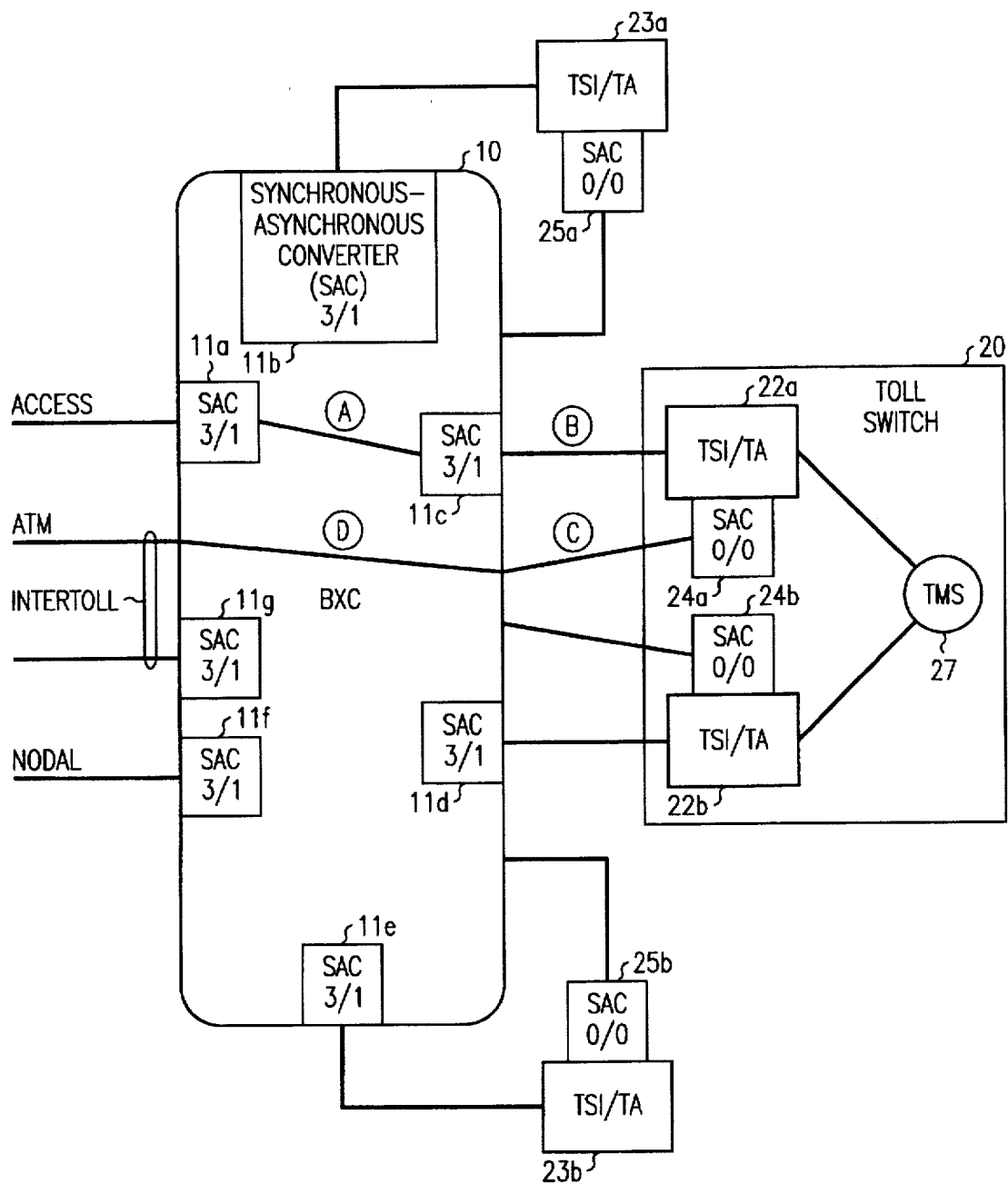

FIG. 8 shows the much simpler configuration made possible when the intertoll facility as shown on FIG. 4 is an ATM intertoll facility. A connection over leg A through the BXC is then connected over leg B to the TSI/TA 22a of the toll switch. The output of TSI/TA 22a is connected to SAC 0/0 24a, thence over leg C, an ATM transmission facility, back to the BXC. In the BXC, the signal received from SAC 0/0 24a is directly switched, without further conversion, over leg D to an ATM intertoll facility. In FIG. 8, leg A is provisioned, D is switched, and B and C are wired.

Figure 9:
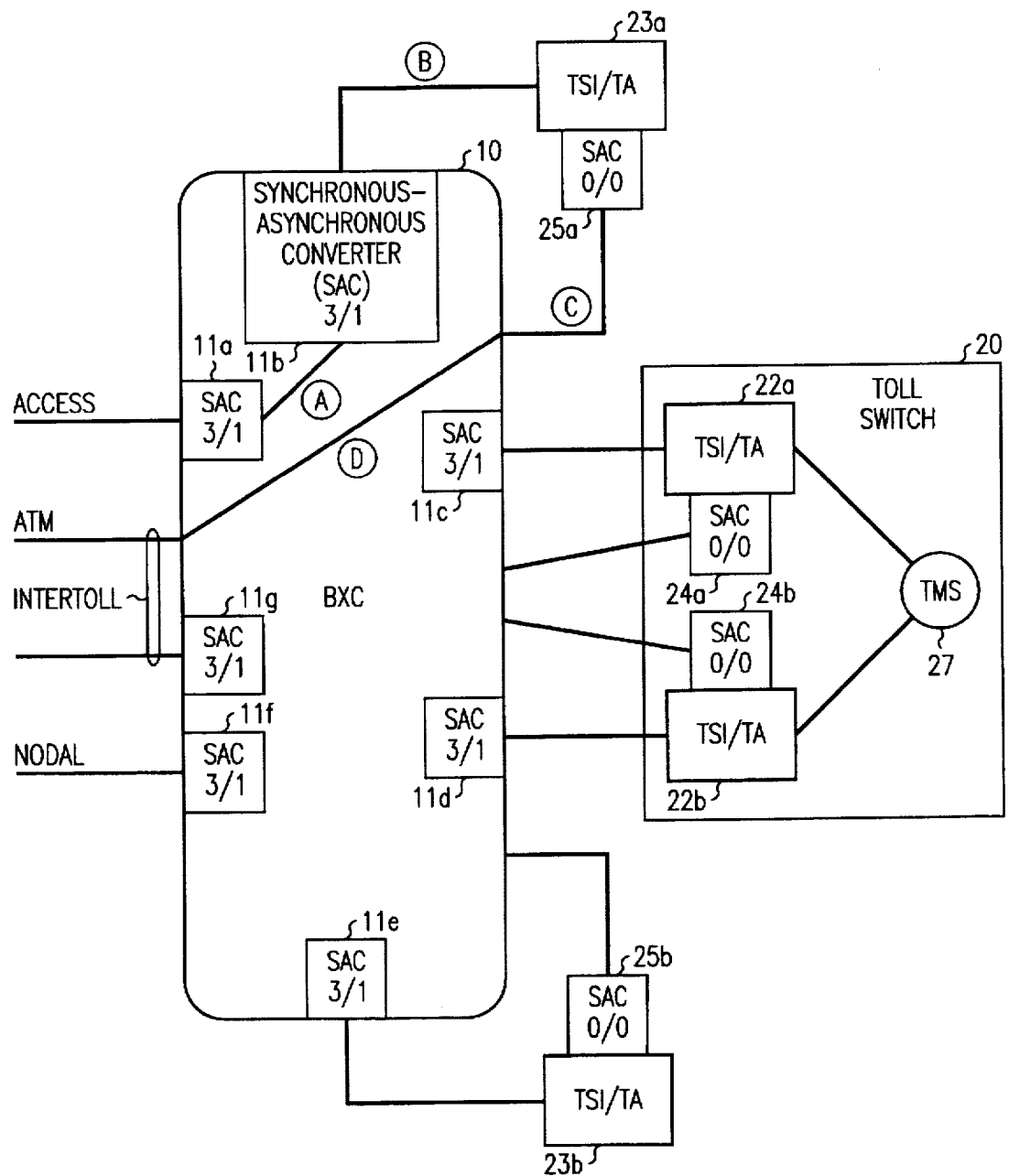

FIG. 9 illustrates the simplification compared with FIG. 5, if both trunks terminate on BXC 10 and the intertoll facility is ATM. A TSI/TA 23a attached to the BXC is used, and therefore it is not necessary to transmit the DS1 signal to the TSI/TA 22a of the toll switch; instead that signal is transmitted over legs A and B to TSI/TA 23a associated with the BXC; then the output of the SAC 0/0 associated with that TSI/TA is returned over leg C back through the BXC 10 through leg D to the ATM inter-toll facility. In FIG. 9, leg A is provisioned, D is switched, and B and C are wired.

Figure 10:
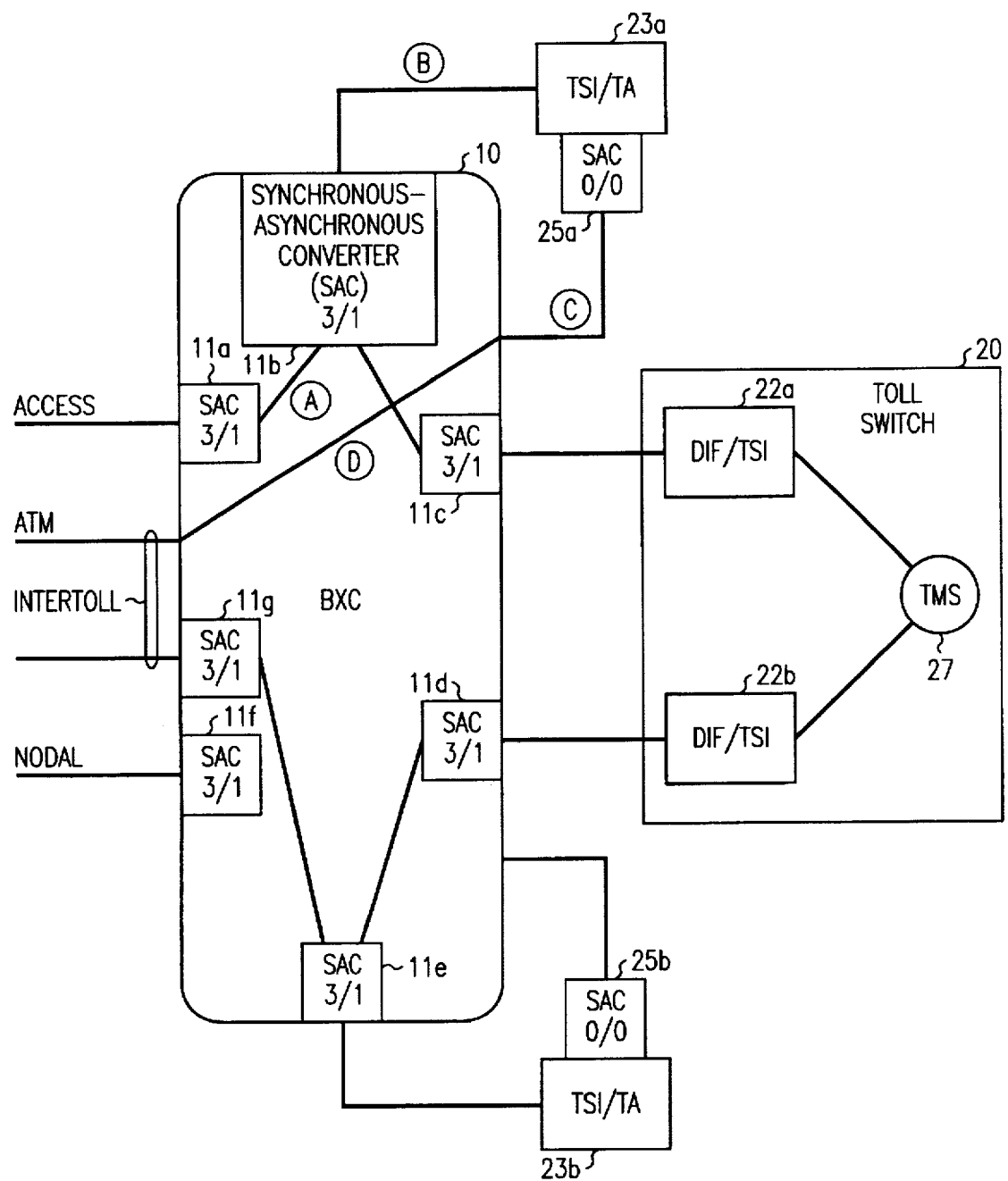

FIG. 10 is comparable to FIG. 7 except that here, the intertoll facility is ATM. Such a facility can receive signals switched directly from SAC 0/0 25a. The incoming trunk is connected through SAC 3/1 11a over leg A to SAC 3/1 11b. The output of SAC 3/1 11b is connected over leg B to TSI/TA 23a. At this point, as in the configuration of FIG. 7, the path is intercepted and, instead of being routed back through leg B to the toll switch, the path is forwarded to SAC 0/0 25a. The output of SAC 0/0 25a is sent over leg C to the BXC and in the BXC is sent over leg D to the ATM intertoll outgoing trunk. In FIG. 10, leg A is provisioned, D is switched, and B and C are wired.

In summarizing the basic characteristics of the system as described in FIGS. 3–10, a number of observations are pertinent:

1. For connections between PCM trunks, two TA facilities are required, essentially one for handling each direction. For connections between the PCM trunk and an ATM facility, only one such TA conversion is required.
2. If the toll switch is not equipped with terminal adapters, then if a terminal adapter is required (and, for example, in the AT&T toll network the terminal adapter is required on all voice connections) the network of the toll switch is not particularly useful since the connection shown in FIG. 5 uses no more resources of the BXC (and does not use the toll switch network at all) than does the connection shown in FIG. 6.
3. The use of this type of configuration is especially attractive if the inter-toll facilities are ATM facilities. Broadband or wideband connections can be established using only BXC 10 and its associated converters. No TA is required for such connections. An ATM signal of any desired bandwidth is directly switched as a series of cells in BXC 10. DS1 signals are extracted from an incoming DS3 stream and switched as DS1 cells. DS3 signals are either converted into DS3 cells by a special converter and then switched by the BXC or are convened into a group of DS1 cells by a first SAC 3/1 converter which are switched and then rebundled in a second SAC 3/1 converter.

During a transition, certain types of calls may continue to be routed through the switch in order to use software available in the switch and not in the SPP or BXC.

We claim:

1. In a telecommunications network, apparatus in a node of said network for establishing a voice band call connection through said node, comprising:
   processor means, responsive to reception of request messages to establish a voice band connection, for generating and transmitting control messages for requesting establishment of said voice band connection;
   A CCSS (cross connect/switching system), connectable to a plurality of transmission facilities, and responsive to said control messages for establishing segments of a switched voice band connection between an incoming voice channel received over one of said plurality of transmission facilities and an outgoing voice channel transmitted over another of said plurality of transmission facilities;
   said CCSS further adapted for switching signals of data rates different from rates for voice band signals;
   said CCSS comprising a plurality of provisioned connections, established and released in response to provisioning request messages;
   wherein at least one said segments of a switched voice band connection is switched over one of said plurality of provisioned connections.

2. The apparatus of claim 1 wherein said CCSS comprises an ATM (asynchronous transfer mode) switching fabric.

3. The apparatus of claim 2 wherein said plurality of transmission facilities comprises a plurality of PCM (pulse code modulation) facilities and wherein said CCSS comprises means for converting between PCM signals for communicating with PCM facilities and ATM signals.

4. The apparatus of claim 3 further comprising terminal adapter means connected to said CCSS for providing terminal adapter functions for calls switched in said CCSS.

5. The apparatus of claim 3 further comprising a PCM switch connected to said CCSS by a plurality of transmission facilities, wherein said call connection is established using call paths in said CCSS, call paths in said PCM switch and call paths connecting said CCSS and said PCM switch.

6. The apparatus of claim 4 wherein said PCM switch comprises switch processor means, and wherein said processor means comprises said switch processor means.

7. The apparatus of claim 1 wherein said processor means comprises SPP (switching processor platform) means for receiving said request to establish a voice band connection and for controlling transmission of control messages for requesting establishment of said voice band connection.

8. The apparatus of claim 7 further comprising a PCM switch comprising switch processor means, connected to said CCSS, wherein said switch processor means and said SPP means cooperate to perform the function of said processor means.

9. The apparatus of claim 1 wherein said provisioned connections are established in groups of voice band connections.

10. The apparatus of claim 1 wherein said provisioning request messages are transmitted from an operations support system to said CCSS.

11. In a telecommunications network, a method of establishing a voice band call connection through a node of said network, comprising the steps of:
   in a CCSS (cross connect/switching system) of said node comprising a plurality of switched voice band connection segments, establishing a plurality of provisioned bundles of channels of voice band connection segments; and
   in said CCSS establishing one or more segments of said voice band call connection by selecting channels of ones of said bundles of provisioned voice band connection segments and establishing one or more segments of said connection by selecting one or more switched voice band connection segments that are not in one of the plurality of bundles of provisioned voice band connections.

12. The method of claim 11 wherein said CCSS comprises an ATM (asynchronous transfer mode) switching fabric and means for converting between PCM (pulse code modulation) signals and ATM signals and wherein said selecting one or more of said switched voice band connection segments comprises selecting connection segments to said means for converting.

13. The method of claim 12 wherein said selecting one or more switched voiceband connection segments comprises selecting a connection segment to a PCM switch.

14. The method of claim 12 wherein selecting one or more switched voice band segments comprises selecting a connection segment to a terminal adapter means.

15. In a telecommunications network, a method of establishing a voice band call connection through a node of said network, comprising the steps of:
   in an ATM (a synchronous transfer mode) CCSS (cross connect/swtiching system) of said node, establishing a connection to an ATM/PCM (ATM/pulse code modulation) converter over a provisioned path;

performing terminal adapter functions on the output of said ATM/PCM converter and converting the adapted PCM signal to another ATM signal; and switching said another ATM signal over a switched path toward an outgoing transmission facility:

wherein said terminal adapter functions comprises at least one of echo cancellation, voice enhancement, in line announcements, in line monitoring for tone digits, and inband supervisory signaling.

16. The method of claim 15 further comprising the step of connecting said another ATM signal to another ATM/PCM converter for connection to an outgoing PCM transmission facility.

17. The method of claim 15 wherein said another ATM signal is directly connectable to an ATM transmission facility.

18. The method of claim 17 wherein the step of performing terminal adapter functions comprises the steps of:

transmitting the output of said ATM/PCM converter to a PCM switch containing a terminal adapter and means for converting the adapted PCM signal to another ATM signal; and transmitting said another ATM signal to said ATM CCSS.

* * * * *